UNITED STATES PATENT OFFICE.

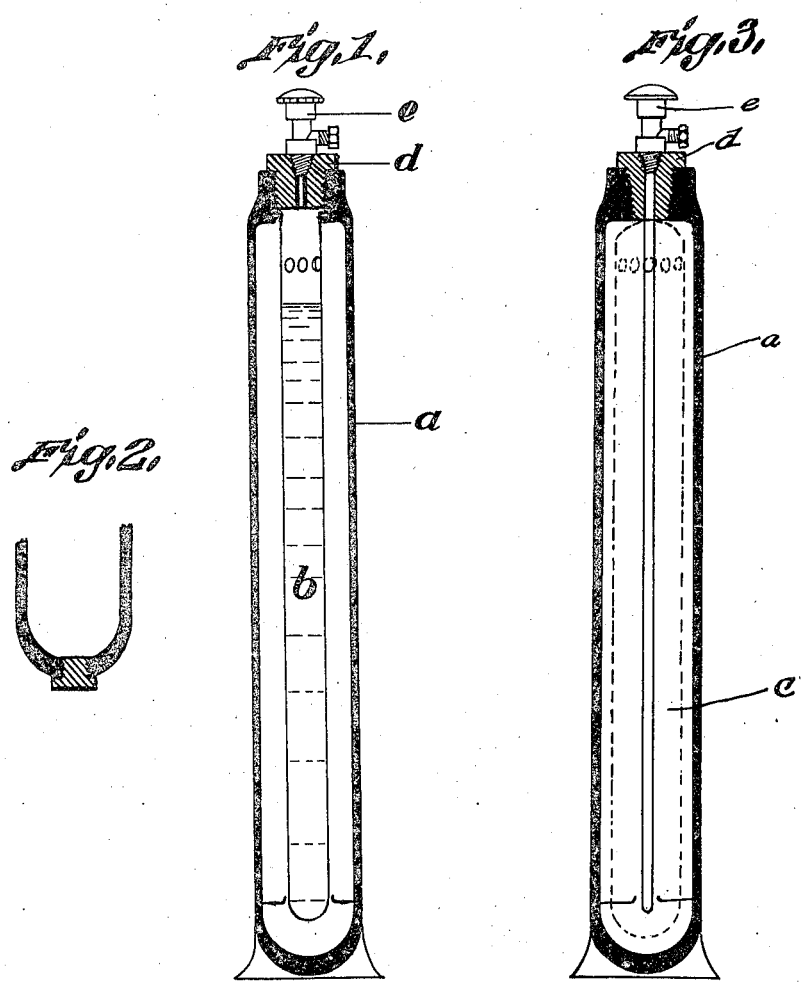

PAUL HEYLANDT, OF SÜDENDE, NEAR BERLIN, GERMANY.

PROCESS FOR FILLING HIGH-PRESSURE VESSELS WITH LIQUEFIABLE GASES.

1,414,359.   Specification of Letters Patent.   Patented May 2, 1922.

Application filed January 3, 1921. Serial No. 434,825.

*To all whom it may concern:*

Be it known that I, PAUL HEYLANDT, a citizen of the German Republic, residing at Südende, near Berlin, Germany, have invented certain new and useful Improvements in Processes for Filling High-Pressure Vessels with Liquefiable Gases, (for which I have filed an application in Germany under date of May 8, 1919, No. H 48,252,) of which the following is a specification.

The present invention relates to a process for filling vessels capable of resisting high pressures with oxygen, nitrogen, hydrogen, air or other liquefiable gases by introducing the gas, such as oxygen, in a liquid state into steel cylinders and by then allowing the oxygen which evaporates from the liquid to gradually and automatically raise the pressure in the closed vessel until the desired pressure of say 150 atmospheres is reached.

A previously proposed method for filling the high pressure vessels now in vogue consists in first conducting the liquefied gas, such as oxygen, into a special measuring vessel separate from the steel cylinder and in then transferring it by pressure into the high pressure vessel (steel cylinder), the idea being that the liquid oxygen shall first flow of its own weight through the very narrow passage of the valve of the vessel and shall subsequently be forced in by the pressure of the gas evaporating in the measuring vessel.

But practical trials have demonstrated the impracticability of this process, for on touching the substantial body of the valve, which is of metal and is a good conductor of heat, the liquefied gas immediately evaporates in the passage of the valve and the small quantities that percolate in a liquid state into the high pressure vessel also evaporate immediately they reach the bottom of the vessel so that the increased pressure of the evaporated gas opposes the further influx of liquefied gas and urges it back into the measuring vessel. Hence the liquefied gas does not evaporate in the high pressure vessel but in the measuring vessel, and that at a very rapid rate, and in the entire apparatus consisting of high pressure vessel, valve, pipes, and the measuring vessel, a uniform pressure is produced, which steadily rises up to a pressure of 150 atmospheres.

Therefore the measuring vessel must also be capable of resisting a pressure of at least 150 atmospheres and at each charge the quantity of oxygen gas that remains in the measuring vessel—and which, at a pressure of 150 atmospheres and with a measuring vessel whose contents are about 10 litres, amounts to 1 to 5 cubic metres—is lost.

To render this process practicable it was proposed that the high pressure vessel should be put into a bath of liquid air so as to cause the liquid oxygen to evaporate only very slowly in flowing into the vessel. But in the first place this requires large quantities of liquid air, 20 to 25 litres being lost for every steel cylinder charged. Besides, a process like this is extremely dangerous, because the steel of which the high pressure vessels are made, when cooled down to —190° Celsius loses all ductility and becomes as brittle as glass, so that a knock of moderate severity, which will frequently occur in practical working, will suffice to smash it. To secure safety in working with high pressure vessels a certain lowest limit of ductility must be maintained and therefore if the above-described process were adopted serious explosions would be inevitable.

In the novel method proposed by me all these sources of trouble and danger are avoided. This method will be explained with reference to the drawing Fig. 1 of which represents a vertical section of a steel cylinder with an internal, thin-walled auxiliary vessel. Fig. 2 is a fragmentary section of the lower end of the shell illustrating a modification; and Fig. 3 is a view similar to Fig. 1, but showing the inner vessel formed from a tube of expansible material inserted through the stopper, the dotted lines indicating the diameter of the tube after expansion.

The principal feature of the invention consists in filling a vessel $b$ in the interior of the steel cylinder or bottle $a$ with liquefied gas, as oxygen. The wall of the internal vessel, which is closed at the bottom, must be made thin so that it can be cooled quickly. It must not touch the lateral wall or bottom of the steel shell or cylinder so that it may be insulated by a layer of quiescent gas from the shell's warm wall. Only a few small struts are provided for centering the inner vessel. At the upper end, immediately under the valve head, a row of holes is made so as to obtain a balancing of the pressure in the spaces inside the inner vessel and around it.

A thin-walled vessel of this kind can be filled with liquefied gases without difficulty because, on account of its small mass, it consumes only a very small quantity of the liquid in being cooled down to the low temperature of liquefied gas. The liquefied gas in this vessel evaporates only slowly because it is insulated, by the air (between $a$ and $b$) that surrounds it, from the heat of the atmosphere, and it receives the heat required for evaporating it only from the head of the cylinder and through the thin wall. The influx of further liquid gas will be prevented only when the inner vessel is filled up to the holes, so that liquid flows down onto the bottom of the steel shell. This part of the liquid will then be evaporated and so much vapour will form that a further influx of liquid through the valve will be prevented. This will also indicate the completion of the charge.

The capacity of the thin-walled vessel from its bottom to its holes must be correctly adapted to the size of the steel cylinder in order that the quantity of the liquid poured in may correspond to the contents of the entire steel cylinder when said contents are subsequently converted into a gaseous state and compressed.

The charging of the thin-walled vessel is carried out in the usual way by means of a siphon or a funnel. The inlet for filling the vessel is opened by unscrewing the small valve head, or the filling is done through a special valve with a bore of a corresponding width.

The internal vessel may be inserted into the cylinder in various ways: the large conical stopper ($d$) may be screwed out of the cylinder and then screwed in again after the vessel has been attached to it, or a conical screw stopper may be arranged in the thickened bottom of the steel cylinder, this stopper being taken out and screwed in again after the inner vessel has been inserted through the bottom. As in either of these two cases the manipulation of screwing the stopper out and in needs only to be carried out once, the stopper can be screwed in again perfectly tight and soldered in place. Finally, the upper conical screw stopper may be left in its place in the neck of the cylinder and a pipe of soft expansible metal may be inserted through the hole provided for the cylinder valve, which pipe is then widened by inflating it by air or hydraulic pressure to such an extent that a long vessel ($c$) of the desired capacity is obtained. The inner vessel can be made of such size that its liquid contents will suffice to fill several steel cylinders with compressed gas in one operation, but it must not be so large that it touches the inner wall of the steel shell. When the valve of the steel cylinder is closed, the evaporation of its liquid contents (oxygen etc.) proceeds slowly without any sudden changes of pressure and without any considerable cooling of the steel cylinder. During the charging process and during the subsequent evaporation of the liquefied gas, the steel cylinder is preferably put into a water bath so that the walls of the cylinder may cool down as little as possible. Excessive cooling of the cylinder must be avoided under all circumstances so as not to go below the lower limit of ductility of the steel.

Another considerable advantage of my novel process is that the oxygen, etc., which compresses itself in the steel cylinder is entirely devoid of moisture and oily vapours. It is well known that in charging the cylinders by means of a compressor, the compressed gas, on its way through the compressor, gets mixed with large quantities of moisture and oily vapour, which cannot be completely extracted by the oil separator, whose action is purely mechanical. Hence in the course of several charges dirty water or oil collects in the steel cylinders, the quantity of this water or oil amounting in some cases to several litres. When the liquid oxygen, which, as we know, is perfectly dry, is conducted into a steel cylinder in accordance with my process, the gas also remains perfectly dry in the cylinder and no moist air can enter into it during subsequent charging operations because a small current of evaporating gas issues from the cylinder whilst it is being charged, this current keeping the moist air in the neighbourhood away from the contents of the cylinder.

I claim:

1. The process of filling compressed gas containers, which consists in placing a given quantity of liquefied gas in a vessel of low specific heat capacity suspended within the container, closing the container, and maintaining the walls of the container at a temperature above 0° C. until the enclosed substance has been converted into gaseous form.

2. The process of filling compressed gas containers, which consists in placing a given quantity of liquefied gas in a vessel of low specific heat capacity suspended within the container and spaced therefrom, closing the container, and maintaining the walls of the container at a temperature above 0° C. until the enclosed substance has been converted into gaseous form.

3. The process of filling compressed gas containers, which consists in placing a given quantity of liquefied gas in a vessel of low specific heat capacity suspended within the container, closing the container, and subjecting the container to the action of a water bath thereby to maintain the walls of the container at a sufficient temperature to convert the enclosed substance into gaseous form.

4. The process of filling compressed gas containers, which consists in placing a given quantity of liquefied gas in a vessel of low specific heat capacity suspended within the container and spaced therefrom, closing the container, and subjecting the container to the action of a water bath thereby to maintain the walls of the container at a temperature above 0° C. until the enclosed substance has been converted into gaseous form.

5. A container for compressed gases, comprising a necked shell capable of resisting high pressure, a stopper in the neck of the said shell, and an inner thin-walled vessel within said shell, the inner vessel being spaced from the walls and bottom of the said shell.

6. A container for compressed gases, comprising a necked shell capable of resisting high pressure, a conical stopper in the neck of the said shell, and an inner thin-walled vessel provided with perforations adjacent to its upper end, said vessel being inserted into the shell spaced from the walls and bottom of the said shell.

7. A container for compressed gases, comprising, a shell capable of resisting high pressure and provided with conical openings at its opposite ends, a removable stopper in each of said openings, and an inner thin-walled vessel inserted in the shell through one of said openings, said vessel being spaced from the wall and bottom of the shell.

8. A container for compressed gases, comprising a necked shell capable of resisting high pressure, a conical stopper in the neck of the said shell, and an inner tube of soft expansible metal capable of inflation after insertion of the vessel into the shell to a predetermined diameter.

In testimony whereof I have signed this specification in the presence of two witnesses.

PAUL HEYLANDT.

Witnesses:
KÄTHE SEECK,
MAX JABLOUSKI.